United States Patent
Komine et al.

(10) Patent No.: US 7,099,356 B2
(45) Date of Patent: Aug. 29, 2006

(54) ROBUST SEEDING TECHNIQUE FOR SINGLE MODE LASER OSCILLATION

(75) Inventors: Hiroshi Komine, Torrance, CA (US); James G. Ho, Chino, CA (US); Hagop Injeyan, Glendale, CA (US); Stephen J. Brosnan, San Pedro, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 387 days.

(21) Appl. No.: 10/440,600

(22) Filed: May 19, 2003

(65) Prior Publication Data
US 2004/0233945 A1 Nov. 25, 2004

(51) Int. Cl.
*H01S 3/098* (2006.01)

(52) U.S. Cl. ...................................................... 372/19

(58) Field of Classification Search .................. 372/19, 372/29.021
See application file for complete search history.

(56) References Cited

U.S. PATENT DOCUMENTS

| | | | |
|---|---|---|---|
| 4,752,931 A | | 6/1988 | Dutcher |
| 5,651,018 A | * | 7/1997 | Mehuys et al. ............ 372/50.1 |
| 5,825,791 A | * | 10/1998 | Injeyan et al. ................. 372/26 |
| 5,838,701 A | | 11/1998 | Deutsch |
| 6,016,323 A | | 1/2000 | Kafka et al. |
| 6,324,191 B1 | * | 11/2001 | Horvath ........................ 372/19 |
| 6,363,089 B1 | * | 3/2002 | Fernald et al. ................ 372/20 |
| 2002/0039375 A1 | * | 4/2002 | Shoji et al. .................... 372/46 |

FOREIGN PATENT DOCUMENTS

| | | |
|---|---|---|
| EP | 0 378 390 | 7/1990 |
| JP | 11 281745 | 10/1999 |

\* cited by examiner

*Primary Examiner*—Minsun Oh Harvey
*Assistant Examiner*—Tod T. Van Roy
(74) *Attorney, Agent, or Firm*—John A. Miller; Warn, Hoffmann, Miller & LaLone, P.C.

(57) ABSTRACT

A method is provided for seeding laser system (10) for single longitudinal mode oscillation. The method includes coupling laser system (10) to be seeded for single mode output to a seed laser radiation source (12). Next, the frequency capture range (44) and spacing (46) of the axial modes (42) of the cavity (24) of the laser system (10) are determined. A seed spectrum (36) is then generated from the seed laser radiation source (12) with a bandwidth (40) corresponding to the axial mode spacing (46). The seed spectrum (36) includes a comb of discrete frequency components (38) with one or more of the discrete frequency components (38) being within the frequency capture range (44) of at least one of the axial modes (42). The seed spectrum (36) is then injected into the cavity (24) such that at least one of the axial modes (42) oscillates with the seed radiation.

15 Claims, 2 Drawing Sheets

ROBUST SEEDING TECHNIQUE FOR SINGLE MODE LASER OSCILLATION

BACKGROUND OF THE INVENTION

1. Field of the Invention

The present invention generally relates to laser systems and, more particularly, to a technique for seeding a laser for single longitudinal mode oscillation.

2. Discussion of the Related Art

Laser systems include a cavity wherein axial (or longitudinal) modes oscillate to stimulate output. Depending on the particular requirements of an application, the laser can be controlled to operate in single or multiple modes. In single mode operation, only one axial mode within the cavity oscillates. In multiple mode operation, more than one axial mode oscillates.

To initiate such axial mode oscillation, radiation from an outside source is injected into the laser cavity. Such injected radiation is known in the art as seed radiation. The seed radiation excites one or more of the axial modes within the laser cavity thereby limiting output to only those modes.

Certain processes involving laser systems require the laser to generate a certain narrow frequency bandwidth to operate properly. One such process is non-linear optical phase conjugation. Within the acceptable bandwidth, the conjugation process provides the desired results. Outside the bandwidth, the conjugation process may cause deleterious effects on the laser system and may even lead to destruction of some optical components.

To ensure proper bandwidth generation, the frequency of the seed radiation must match the frequency of one of the axial modes within the laser cavity. This ensures that the laser cavity only emits one frequency or axial mode. The end result is that the laser cavity emits a controlled frequency rather than the normal multitudes of frequencies.

Conventional techniques for matching the seed radiation to a single axial mode rely on single frequency seed radiation sources and some type of resonant feedback control system. The feedback allows the laser cavity or the seed radiation to be adjusted in real time to ensure nearly continuous matching. In one mechanism, feedback is employed to dither the laser cavity length so that the axial modes within the cavity scan for the best coincidence with the external seed radiation frequency. After the best match is found, the laser cavity is locked in place. In another mechanism, feedback is employed to dither the seed frequency to match a fixed laser cavity. In this case, the seed frequency is varied as it is injected until a matched condition is achieved. Thereafter, the seed frequency is fixed.

While the performance of such feedback control based systems is generally satisfactory, it is not always reliable. This is particularly true under demanding environmental conditions. For example, mechanical vibration in aircraft and other mobile platforms can impact the dithering of the cavity or the seed frequency. Attempts to dampen the system from external vibrational influences with very stiff platforms have been only marginally successful at isolating the system. Eventually, the external vibrations negate the attempt to match the frequencies with feedback control.

Therefore, it is an object of the present invention to provide a more robust seeding technique for stimulating single mode oscillation in a laser system so that the system will be impervious to external vibrational influences.

SUMMARY OF THE INVENTION

The above and other objects are provided by a method of seeding a laser for single mode oscillation. The method includes coupling a laser system to be seeded for single mode output to a seed laser radiation source. Next, the frequency capture range and spacing of the axial modes of the cavity of the laser system are determined. A seed spectrum is then generated from the seed laser radiation source with a bandwidth corresponding to the axial mode spacing. The seed spectrum includes a comb of discrete frequencies with one or more of the discrete frequencies being within the frequency capture range of at least one of the axial modes. The seed spectrum is then injected into the cavity such that at least one of the axial modes oscillates with the seed radiation. In a preferred embodiment of the present invention, the method determines if more than one of the axial modes oscillates with the seed radiation. If so, the seed spectrum is shifted by one half of the axial mode spacing to ensure single mode oscillation. The seed laser radiation source preferably comprises a continuous wave single frequency laser coupled to one or more of electro-optic phase modulators operating at different frequencies.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION OF THE EMBODIMENTS

The present invention is directed towards a method of seeding a laser for single mode oscillation. According to the present invention, a seed spectrum from a seed laser radiation source is delivered to a laser system to be seeded for single mode output. The seed spectrum includes a comb of discrete frequencies. At least one of the discrete frequencies is within the capture range of an axial mode of the laser system to be seeded. The bandwidth of the seed spectrum is equal to the axial mode spacing within the cavity. As such, at least one of the axial modes within the cavity will capture one of the seed frequencies within the spectrum and oscillate. If more than one of the axial modes oscillates, the seed spectrum is shifted by one half of the axial mode spacing to ensure single mode output.

Figure 1:
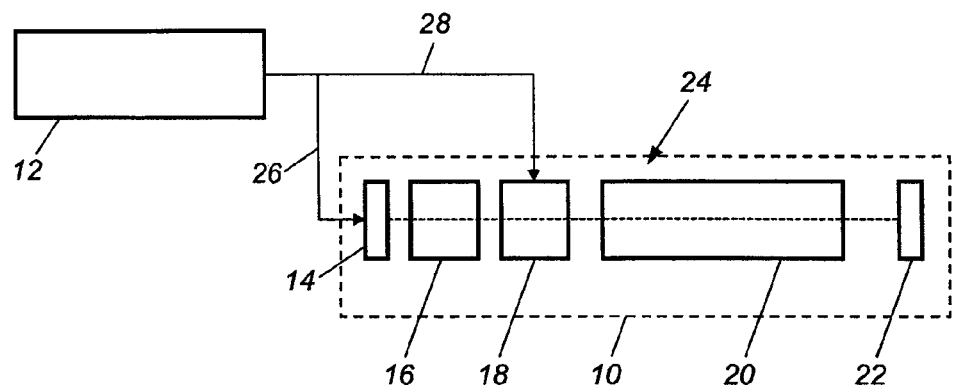
FIG. 1 is a schematic illustration of a laser system coupled to a seed laser radiation source for stimulating single mode output in accordance with the teachings of the present invention.

Turning now to the drawing figures, FIG. 1 schematically illustrates a laser system 10 to be seeded for single mode output coupled to a seed laser radiation source 12. The laser system 10 includes an end mirror 14 disposed upstream of a Q-switch 16. The Q-switch 16 is disposed upstream of a polarizer 18. The polarizer 18 is disposed upstream of a gain medium 20. The gain medium 20 is disposed upstream of an output mirror 22.

The end mirror 14 and output mirror 22 comprise the laser cavity 24 of the laser system 10. The polarizer 18 and Q-switch 16 hold off laser oscillation and generate a pulsed output. To initiate single axial mode output, the laser cavity 24 is injected with seed radiation from the seed laser radiation source 12 via a first path 26 leading to the end mirror 14 and a second path 28 leading to the polarizer 18. This provides coupling of the seed radiation within the laser cavity 24.

Figure 2:
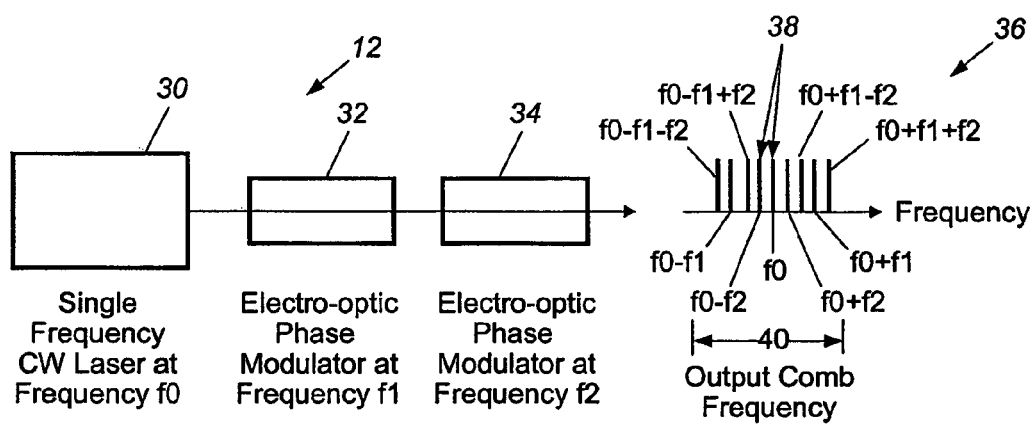
FIG. 2 is a schematic illustration of a seed laser radiation source and the seed radiation spectrum generated thereby.

Turning now to FIG. 2, an exemplary embodiment seed laser radiation source 12 is illustrated. The source 12 includes a single frequency continuous wave laser 30 coupled in series to a first electro-optic phase modulator 32. The first electro-optic phase modulator 32 is coupled in series to a second electro-optic phase modulator 34. The seed radiation source 12 outputs a seed spectrum 36 including a plurality of discrete frequencies 38. The plurality of discrete frequencies 38 is sometimes referred to as a comb of frequencies. The spectrum 36 is generated by the first and second phase modulators 32 and 34 synthesizing the radiation from the single frequency laser 30.

More particularly, the continuous wave laser 30 operates at a frequency F0. The first electro-optic phase modulator 32 operates at a frequency F1. The second electro-optic phase modulator 34 operates at a frequency F2. The combination generates the discrete frequencies F0, F0−F2, F0+F2, F0−F1+F2, F0+F1 F0+F1, F0−F1−F2, and F0+F1+F2.

For example, if the frequency of the first modulator 32 is set to 90 megahertz and the frequency of the second modulator 34 is set to 30 megahertz, two bands are created by the first modulator 32 at ±90 megahertz. This output is sent to the second modulator 34, which generates two additional bands at ±30 MHz for each of the 0 and ±90 MHz components. This yields 0, −30, 30, −60, 60, −90, 90, −120 and 120 megahertz frequencies. As such, the source 12 provides a radiation spectrum 36 having a known spacing or bandwidth 40 and a known number of frequency components 38.

Figure 3:
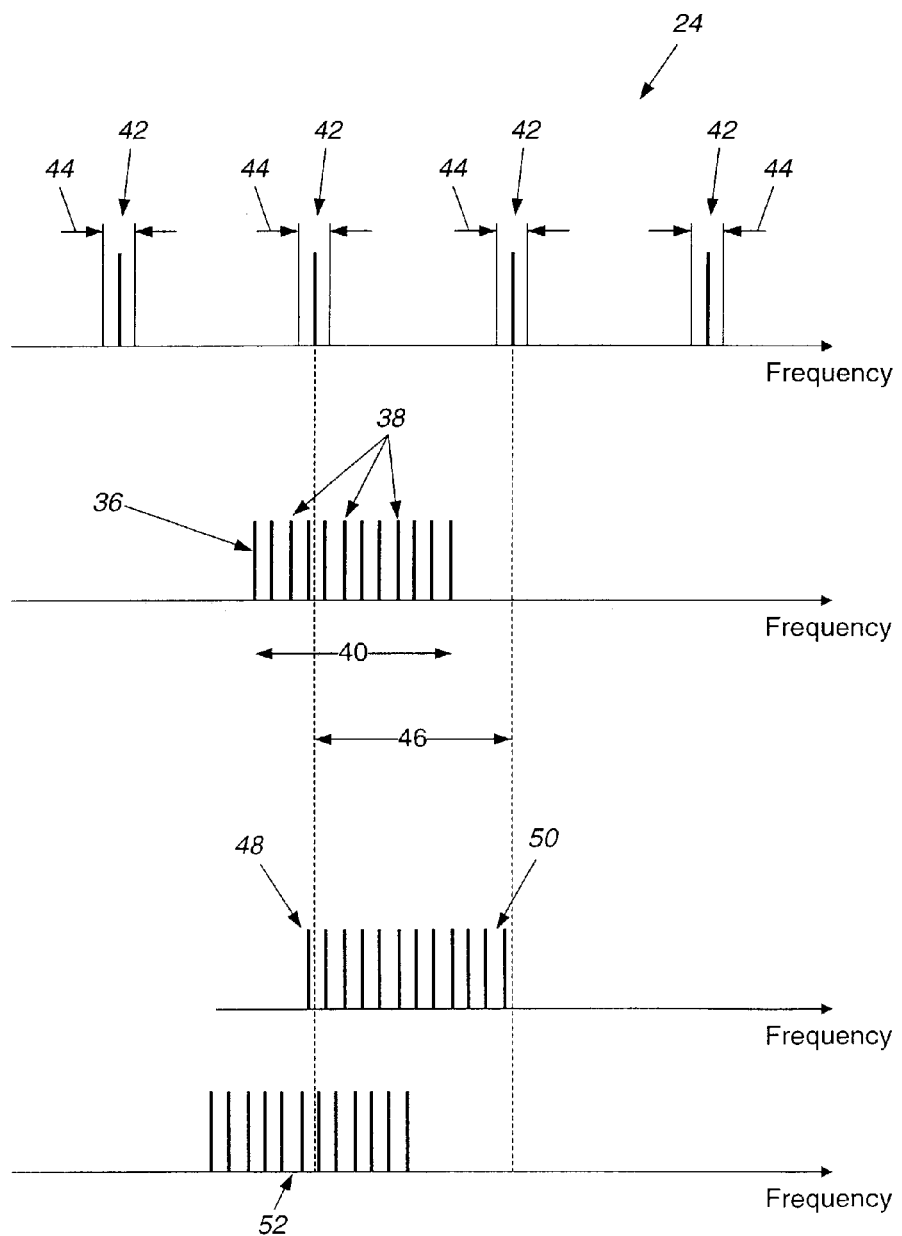
FIG. 3 is a graphical illustration of the spectral requirements of the present invention.

Referring collectively to FIGS. 1 and 3, the spectral requirements of the present invention will be described. Each axial mode 42 within the laser cavity 24 can capture seed radiation within a certain frequency capture range 44. The capture range 44 is a frequency range wherein the frequency of external seed radiation is so close to the resonant frequency of an axial mode 42 that there is a good probability that the axial mode 42 will start to oscillate when exposed to the seed radiation. The resonant frequency of each axial mode 42 is finite in width and, as such, the seed frequency components 38 must be within a certain frequency distance from that resonance to be captured. The capture range 44 gives the minimum density, i.e., comb spacing, of the spectrum 36 that must be injected to guaranty that a discrete frequency component 38 will be within a capture range 44.

To determine the capture range 44, a measurement of the laser cavity 24 may be taken. Radiation from a seed laser generating a constant frequency is injected into the laser cavity 24 while the cavity 24 manually undergoes a scanning of the end mirror 14. As the end mirror 14 is scanned, different resonant frequencies are passed through. When the end mirror 14 scans through the capture range 44 of an axial mode 42 of the cavity 24, the laser 10 produces a single frequency output. Outside of the capture range 44, the single output frequency ceases and the laser 10 outputs multi-mode frequencies. As the end mirror 14 continues to be scanned, a single frequency output is reacquired when the resonant frequency of the next axial mode 42 of the laser cavity 24 is reached.

While the capture range 44 gives the spacing of the spectrum 36, the number of discrete frequency components 38 injected into the laser cavity 24 is also critical. The seed radiation spectrum 36 has a bandwidth 40, which is selected to equal the laser cavity axial mode spacing 46. More particularly, the bandwidth 40 is controlled to correspond to the free spectral range of the laser cavity 24.

The laser cavity 24 has a set of frequencies that cause the axial modes 42 to oscillate. The set of frequencies is the free spectral range of the cavity 24. The seed radiation spectrum 36 consists of a plurality of frequency components 38 that spans almost exactly one free spectral range of the laser cavity 24. By providing a spectrum 36 with a bandwidth 40 equal to the free spectral range, so that the spectrum 36 just fits between one of two adjacent axial mode spacings 46, the seed spectrum 36 always overlaps one axial mode 42, and in rare cases two adjacent axial modes 42, even if the laser cavity or the seed laser spectrum center frequency shift relative to each other.

If two frequency components 48 and 50 fall within the seed capture range 44 of two adjacent axial modes 42, the two adjacent axial modes 42 may oscillate with the seed radiation. For some applications, this will have no impact. In other cases, having two modes in oscillation is not acceptable. To avoid this, the spectrum 36 is shifted by one-half of the axial mode spacing 46 to a location as generally indicated at 52. Since only one frequency component 38 will thereafter fall within a seed capture range 44, single mode oscillation is restored.

Referring again to FIG. 2, although the pair of modulators 32 and 34 provide good control of the relative amplitudes and components 38 of the spectrum 36, a single modulator seed radiation source 12 may also be used. In this case, the first modulator 32 can be overdriven so that it generates five bands at the harmonics of the first frequency. For example, if the first modulator 32 is set to operate at 30 megahertz, it could be driven to generate 0, 30, 60, 90, and 120 megahertz components. However, the amplitudes generated by this approach are not as uniform as those provided in the two modulator technique.

Other alternate examples of seed laser radiation sources 12 include a fiber laser with bandwidth-controlled output and semiconductor lasers. In a fiber laser, a multi-longitudinal mode output of a certain finite bandwidth is generated. The mode spacing of the fiber laser is dictated by the length of the fiber. As such, the length of the fiber is chosen so that the mode spacing of the output is equal to the desired seed frequency spacing. The output spectrum mode of fiber laser is limited so that the output spectrum consists of a pre-selected number of modes which match the width of the longitudinal mode spacing of the laser to be seeded. Since a fiber laser typically produces a rather broadband output, a dispersive element, filter or other optical mechanisms may be used to limit the lasing bandwidth to a certain frequency range.

In a semi-conductor laser, the mode spacing tends to be very far apart. However, a single mode output is desired with a pre-selected bandwidth. To accomplish this, the continuously distributed frequency components of the semi-conductor laser are made available essentially all the time when coupled to the laser to be seeded.

Another alternative is to couple the laser to be seeded with another solid-state laser of a similar material. The second laser includes a different laser cavity for generating radiation with the pre-selected mode spacing and bandwidth. However, this is a rather forceful way of generating the seed radiation.

In view of the foregoing, one can appreciate that the present invention achieves seeded laser oscillation on a single mode or an adjacent pair of modes using a seed radiation spectrum, which is made up of a comb of discrete frequencies. The bandwidth of the seed spectrum is selected to equal the axial mode spacing of the laser cavity to be seeded. When the seed radiation is injected into the laser cavity, typically one seed frequency is within a capture range of an axial mode. This assures oscillation on a single mode most of the time. When the seed spectrum happens to overlap a pair of adjacent axial modes, oscillation on two modes may occur. The seed spectrum may then be shifted by one-half of the axial mode spacing to restore single mode oscillation. A feedback scheme can be employed for determining such a condition by sensing mode beating.

The present invention is advantageous in that it ensures robust seeding and relaxes laser system design for demanding environments. Further, the seed radiation source can be constructed using commercially available parts. For example, a continuous wave single frequency laser and electro-optic phase modulators can synthesize the seed spectrum. Sources may also include fiber lasers and semiconductor diode lasers. This technique is especially cost-effective for laser systems in which even a temporary loss of single mode output results in significant performance penalty. Such systems include defense applications related to illuminators and lidars in aircraft and other mobile platforms. Possible industrial uses include those requiring high power and high brightness laser beams.

Beneficially, there is no feedback required for operation of the present invention. The laser cavity is simply flooded with the radiation spectrum and if the laser cavity is mechanically, thermally or otherwise perturbed to change the frequency conditions, the axial modes will always find a frequency to match within the seed spectrum. Likewise, if the seed radiation source shifts up and down in its central frequency, the seed frequencies slide to match an axial mode in the laser cavity.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A method for seeding a laser for single mode oscillation comprising the steps of:
    providing a laser system to be seeded for single mode output;
    coupling a seed laser radiation source to said laser system, wherein coupling a seed laser radiation source includes providing a continuous wave single frequency laser coupled to at least one electro-optic phase modulator;
    determining an axial mode spacing of a cavity of said laser system;
    generating a seed spectrum from said seed laser radiation source having a bandwidth corresponding to said axial mode spacing, said seed spectrum including a plurality of discrete frequencies, wherein the bandwidth of the seed spectrum is set to be about equal to the axial mode spacing of the cavity to define the spacing of the plurality of discrete frequencies, and wherein the single frequency continuous wave laser provides a laser beam at a first frequency and the electro-optic phase modulator operates at a second frequency so that the combination of the first frequency and the second frequency generates the plurality of discrete frequencies that define the bandwidth of the seed spectrum;
    injecting said seed spectrum into said cavity; and
    capturing at least one of said plurality of discrete frequencies by an axial mode of said cavity.

2. The method of claim 1 further comprising the steps of:
    determining if more than one of said plurality of discrete frequencies have been captured; and
    shifting said seed spectrum by one-half of said axial mode spacing if more than one of said plurality of discrete frequencies have been captured.

3. The method of claim 2 wherein the step of determining if more than one of said plurality of discrete frequencies have been captured further comprises sensing mode beating.

4. The method of claim 1 wherein said at least one electro-optic phase modulator includes a first electro-optic phase modulator operating at the second frequency and a second electro-optic phase modulator operating at a third frequency, and wherein the combination of the first, second and third frequencies generates the plurality of discrete frequencies.

5. The method of claim 1 further comprising the step of providing a fiber laser having bandwidth controlled output as said seed laser radiation source.

6. The method of claim 1 further comprising the step of providing a semiconductor laser as said seed laser radiation source.

7. A method for seeding a laser for single mode oscillation comprising the steps of:
    generating seed radiation using a continuous wave single frequency laser coupled to at least one electro-optic phase modulator;
    determining a frequency capture range of the seed radiation that axial modes in a cavity of said laser can capture;
    generating a seed spectrum having a spectrum bandwidth corresponding to a spacing of said axial modes in said cavity, said seed spectrum including a plurality of discrete frequencies with one or more of said discrete frequencies being within said frequency capture range of at least one of said axial modes, wherein the spectrum bandwidth of the seed spectrum is substantially equal to the frequency capture range of the cavity to define the spacing of the plurality of discrete frequencies, and wherein the single frequency continuous wave laser provides a laser beam at a first frequency and the electro-optic phase modulator operates at a second frequency so that the combination of the first frequency and the second frequency generates the plurality of discrete frequencies that define the bandwidth of the seed spectrum; and
    injecting said seed spectrum into said cavity such that at least said one of said axial modes oscillates with said seed radiation.

8. The method of claim 7 further comprising the steps of:
    determining if more than said one of said axial modes oscillates with said seed radiation; and
    shifting said seed spectrum by one-half of said spacing of said axial modes if more than said one of said axial modes oscillates with said seed radiation.

9. The method of claim 8 wherein the step of determining if more than said one of said axial modes oscillates with said seed radiation further comprises sensing mode beating.

10. The method of claim 7 wherein said at least one electro-optic phase modulator includes a first electro-optic phase modulator operating at the second frequency and a second electro-optic phase modulator operating at a third frequency, and wherein the combination of the first, second and third frequencies generates the plurality of discrete frequencies.

11. The method of claim 7 wherein the continuous wave single frequency laser includes a fiber laser having bandwidth controlled output.

12. The method of claim 7 wherein the continuous wave single frequency laser includes a semiconductor laser.

13. A method for seeding a laser for single mode oscillation comprising the steps of:
providing a laser system to be seeded for single mode output;
coupling a seed laser radiation source to said laser, wherein coupling a seed laser radiation source includes providing a continuous wave single frequency laser coupled to at least one electro-optic phase modulator;
determining an axial mode spacing of a cavity of said laser;
determining a frequency capture range of seed radiation that axial modes in said cavity can capture;
generating a seed spectrum from said seed laser radiation source having a bandwidth corresponding to said axial mode spacing, said seed spectrum including a plurality of discrete frequencies with one or more of said discrete frequencies being within said frequency capture range of at least one of said axial modes, wherein the bandwidth of the seed spectrum is substantially equal to the axial mode spacing of the cavity to define the spacing of the plurality of discrete frequencies, and wherein the single frequency continuous wave laser provides a laser beam at a first frequency and the electro-optic phase modulator operates at a second frequency so that the combination of the first frequency and the second frequency generates the plurality of discrete frequencies that define the bandwidth of the seed spectrum; and
injecting said seed spectrum into said cavity such that at least said one of said axial modes oscillates with said seed radiation.

14. The method of claim 13 further comprising the steps of:
determining if more than said one of said axial modes oscillates with said seed radiation; and
shifting said seed spectrum by one-half of said spacing of said axial modes if more than said one of said axial modes oscillates with said seed radiation.

15. The method of claim 13, wherein the at least one electro-optic phase modulator includes a first electro-optic phase modulator operating at the second frequency and a second electro-optic phase modulator operating at a third frequency, and wherein the combination of the first, second and third frequencies generates the plurality of discrete frequencies.

* * * * *